United States Patent Office 3,424,607
Patented Jan. 28, 1969

3,424,607
ATACTIC POLYOLEFIN RELEASE AGENTS
Salvatore G. Coscia, Philadelphia, Pa., assignor to De Kalb Industries, Inc., King of Prussia, Pa., a corporation of Pennsylvania
No Drawing. Filed June 15, 1964, Ser. No. 375,285
U.S. Cl. 117—5.1                          4 Claims
Int. Cl. B29c 1/04

ABSTRACT OF THE DISCLOSURE

A release agent which is used in a mold to prevent adhesion between the object molded and the surface of the mold. This release agent consists essentially of a mixture of about 0.5–40% by weight atactic polyolefin and about 99.5–60% by weight of a liquid vehicle which may be a saturated or unsaturated aliphatic or aromatic hydrocarbon.

This invention relates to release agents for preventing adherence between two surfaces, and it particularly relates to release agents for use with aqueous type adherents.

The problem of adherence between two surfaces between which is a layer of an aqueous substance which has a tendency to adhere to both surfaces is one of long standing. It is a particular problem in the casting or molding of shaped bodies where the substance from which the body is made is initially of an aqueous cement or paste-like plastic quality which is allowed to harden within a mold or the like. In such instances, during the hardening period, the substance also adheres to the mating surfaces of the mold and when it hardens, it is firmly adhered to the mold. It is then often necessary to destroy the mold in order to remove the molded product without seriously damaging it.

In order to overcome the problem of adherence, it has heretofore been proposed to coat the inner surfaces of the mold with certain organic substances which are naturally antagonistic to water, such as paraffin waxes, mineral oils, and the like. However, the waxes tended to melt at relatively low temperatures, after which they would flow away from any vertical or inclined surface. Furthermore, these waxes were difficult to apply to the mold surfaces in a uniform manner. The oils, on the other hand, because of their initial relatively low viscosity, would quickly run off from any vertical or inclined surfaces as soon as applied. Furthermore, these oils would penetrate any pores or interstices of the mold so that, unless the mold was absolutely non-porous and uniplaner, the oil would quickly disappear from the surfaces where it was needed. This was an especial problem in those situations where lengthy aging was required in which the product had to remain in the mold for a week or more. In addition, these oils had a tendency to evaporate so that within a relatively short time little would remain even if there was no run-off or no soaking into the pores.

In accordance with the present invention, the above difficulties are overcome by coating the inner surfaces of the mold with a composition consisting essentially of a mixture of an atactic polyolefin and a non-aqueous liquid vehicle or carrier. The atactic polyolefin may be selected from the group consisting of atactic polypropylene, atactic polyethylene and atactic copolymers of ethylene and propylene. The liquid vehicle may be selected from the paraffin series with a carbon chain length of $C_4$ to $C_{15}$. Also utilizable are the unsaturated aliphatic hydrocarbons of a chain length between $C_4$ and $C_{10}$. In addition such aromatics as benzene, toluene, xylene and cyclohexane may be used. In general, all halogen substituted hydrocarbons, both aliphatic and aromatic, which are normally in the liquid state, may be used, including the halogenated aliphatics between $C_4$ and $C_{15}$ and whichever halogenated aromatics are normally liquid. All ethers such as petroleum ether and ethyl ether may be used.

However, it is not possible to use for this purpose such other normally used solvents as alcohols, ketones, glycols or acids.

The non-viscous type of oils are preferred as the vehicle, and especially preferred are the mineral seal type oils because they quickly evaporate, leaving only the atactic polyolefin coating. Kerosene is, however, a good vehicle for the present purposes, as are also such vegetable oils as peanut oil, olive oil, cotton seed oil, etc.

The atactic polyolefin compositions embodying the present invention are, in all cases, more viscous than the oils or other vehicles per se, whereby the polyolefin acts as a host for the vehicle and prevents quick run-off after application to the surface. However, the higher the relative proportions of atactic polyolefin the thicker and more viscous is the final product.

The compositions may comprise varying proportions of the atactic polyolefin relative to the vehicle within the range of between about 0.5–40% by weight of the atactic polyolefin and about 99.5–60% by weight of the vehicle. The preferable range is 1–30% by weight of the atactic polyolefin and 99–70% by weight of the vehicle. The most preferred proportion is about 20% by weight of the atactic polyolefin to about 80% by weight of the vehicle. Regardless of the relative proportions used, however, the composition is prepared by mixing the atactic polyolefin and the vehicle together until a thorough intermixing has taken place. In such mixtures, the higher the relative proportion of atactic polyolefin the thicker and more viscous is the final product.

The following examples are illustrative of the present invention:

EXAMPLE 1

25% by weight atactic polypropylene is mixed, at a temperature of 170° F., with 75% by weight of a mineral seal type oil known by the trade name "Absorbent Oil K" (produced by the Atlantic Refining Co., Philadelphia, Pa.) until a thorough and homogeneous mixture is obtained. This mixture is the final product which is of a fairly viscous, grease-like nature at room temperature. It may be applied to the surfaces of a mold in the same manner as any ordinary grease.

EXAMPLE 2

20% by weight an atactic ethylene-propylene co-polymer, in which the proportion of ethylene to propylene is about 60–40% by weight, is thoroughly mixed with 80% by weight of kerosene, at a temperature of 140° F. The resultant product is somewhat less viscous than that of Example 1 and may be applied by brushing or dipping.

EXAMPLE 3

10% by weight atactic polypropylene is thoroughly mixed with 90% by weight of a mineral seal type oil having the trade name Mentor 28 (produced by Esso Standard Oil Co., New York, N.Y.), the mixture taking place at 175° F. The final product is a light, relatively non-viscous composition which is liquid and free-flowing at room temperature. It may be applied by spraying, brushing or dipping.

EXAMPLE 4

15% by weight atactic polypropylene is thoroughly mixed with 85% by weight peanut oil at a temperature of 250° F. The product is slightly viscous and may be applied by brushing or dipping.

EXAMPLE 5

5% by weight atactic polypropylene is thoroughly mixed with 95% by weight xylol at room temperature. The resulting product is an opalescent, limpid mixture which permits the application of a thin film on the treated surface.

EXAMPLE 6

30% by weight atactic polypropylene is thoroughly mixed with 70% by weight amylene at room temperature to provide a relatively viscous product.

EXAMPLE 7

20% by weight atactic polypropylene is thoroughly mixed, at room temperature, with 80% by weight benzene. The final product is relatively non-viscous and easily brushable onto the treated surface.

EXAMPLE 8

30% by weight atactic polypropylene is thoroughly mixed, at room temperature, with 70% by weight chlorinated naphthalene to provide a fairly viscous product.

EXAMPLE 9

2% by weight atactic polypropylene is thoroughly mixed, at room temperature, with 98% by weight ligroin to provide a relatively non-viscous, sprayable or brushable product.

The present compositions are especially helpful in the molding or casting of shaped bodies made of cement, ceramics, synthesic resins, molded paper pulp and any other hardenable plastic substance carried in an aqueous suspension, emulsion or solution. They are utilizable with molds made of wood, metal, ceramic, synthetic resins such as phenolics, etc.

Illustrative of one use is the casting of cement pipes. This type of pipe is molded from aqueous slurries in wooden, metal or synthetic resin molds. When so made, they normally tend to strongly adhere to the molds, thereby making it difficult to remove them without damaging either themselves or the molds. However, when the molds are coated with one of the compositions embodying the present invention, a slight relative movement between the mold and pipe is sufficient to break any adherence and the pipe is easily removed from the mold.

It is also to be noted that the present compositions are self-sealing in that if any cracks or fissures develop in the mold because of swelling or of internal or external pressure, these compositions automatically seep into such cracks and fissures and seal them in the manner of a caulking agent. This not only extends the life of the molds but prevents seepage of the fluid or plastic material used to form the shaped body.

These compositions, when used as release agents in molds, have the further advantage of permeating the pores of the shaped body, such as a cement body, so that after the water and the liquid vehicle evaporate or are otherwise removed, the atactic polyolefin remains as an impregnant to give the cement a water-repellant quality. In this same general manner, the composition can be used to impregnate textiles to make them water-repellant or it can be used to impregnate felt or the like to form a substitute for tar paper as a roofing or building material. Such impregnated felt would have the advantage, as against tar paper, of being dyed to a particular color or shade, of being a better insulator to heat and sunlight, of remaining solid at temperatures where tar will flow, and of being elastic at low temperatures, even down to −20° F., where tar or pitch is brittle and easily cracked.

In addition, these release agents may be used in skin creams, such as for the hands, face or body. In such creams they serve as anti-wetting agents to protect the skin against exposure to water or dampness. One example of a skin cream embodying the present invention is as follows:

| Component— | Parts by wt. |
|---|---|
| Atactic polypropylene - Mentor 28 mixture 10:90% by wt. | 47.9 |
| Beeswax | 6.0 |
| Spermaceti | 6.0 |
| Cetyl alcohol | 1.0 |
| Lanolin | 1.0 |
| Water | 38.0 |
| Perfume | 0.1 |

The atactic polypropylene-Mentor 28 mixture plus the beeswax, spermaceti, cetyl alcohol and lanolin are mixed together and heated to form a melt. The mixture is then cooled to 50° C. and the water is added with continuous stirring. It is then cooled, with continuous stirring, to 40° C. At this point, the perfume is added and the mixture is then cooled, with continuous stirring, to between 25°–30° C. to give the final product.

Obviously, many modifications and variations of the present invention are possible in the light of the above teachings. It is, therefore, to be understood that, within the scope of the appended claims, the invention may be practiced otherwise than as specifically described.

The invention claimed is:

1. The method of preventing adherence between a mold and the object being molded which comprises coating the mold surface, prior to exposure thereof to the material to be molded, and at ambient temperature, with a composition consisting essentially of a mixture of about 0.5–40% by weight atactic polyolefin selected from the group consisting of atactic polypropylene, and atactic co-polymers of ethylene and propylene, and about 99.5–60% by weight of an organic liquid vehicle in which said atactic polyolefin is substantially soluble.

2. The method of claim 1 wherein said liquid vehicle is selected from the group consisting of saturated aliphatic hydrocarbons having between 4 and 15 carbon atoms in the chain, unsaturated aliphatic hydrocarbons having between 4 and 10 carbon atoms in the chain, normally liquid halogen-substituted aliphatic and aromatic hydrocarbons and ethers.

3. The method of claim 1 wherein said material forming said object is a settable plastic aqueous mass.

4. The method of claim 1 wherein the proportions of the components of the mixture are about 1–30% by weight atactic polyolefin and about 99–70% by weight of the vehicle.

References Cited

UNITED STATES PATENTS

| | | | |
|---|---|---|---|
| 2,851,330 | 9/1958 | Taylor | 117—5.3 |
| 2,923,041 | 2/1960 | Ryznar | 117—5.3 |
| 2,098,536 | 11/1937 | Charch et al. | 260—33.2 |
| 3,297,609 | 1/1967 | Hagemeyer et al. | 260—897 |
| 2,627,938 | 2/1953 | Frohmader et al. | 167—91 |
| 2,639,313 | 5/1953 | Barth | 117—5.1 |
| 2,998,401 | 8/1961 | Reavis et al. | 260—33.6 |
| 3,012,016 | 12/1961 | Kirk et al. | 260—33.6 |
| 3,060,145 | 10/1962 | Moscrip | 260—33.6 |
| 3,079,218 | 2/1963 | Di Giulio et al. | 260—33.6 |
| 3,258,340 | 6/1966 | Riboni | 260—897 |

MORRIS LIEBMAN, *Primary Examiner.*

R. BARON, *Assistant Examiner.*

U.S. Cl. X.R.

106—38.25; 117—5.3; 260—33.2, 33.6; 264—338